J. A. KNIGHT.
Cheese-Box.
No. 212,100.      Patented Feb. 11, 1879.
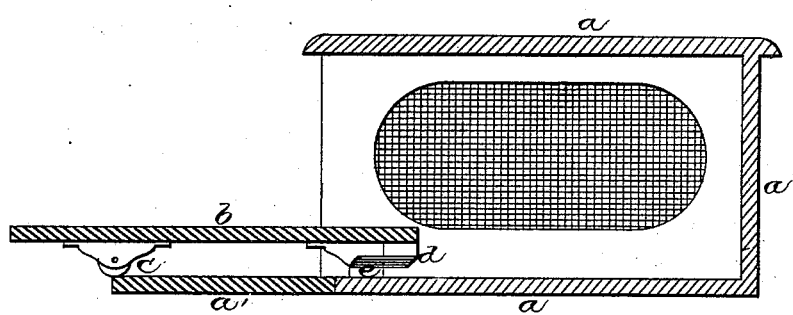
Witnesses:            Inventor:
Chas. N. Kimball.     John A. Knight
Chas. S. Mooney       Per atty
                      William Henry Clifford

UNITED STATES PATENT OFFICE.

JOHN A. KNIGHT, OF AUBURN, MAINE.

IMPROVEMENT IN CHEESE-BOXES.

Specification forming part of Letters Patent No. 212,100, dated February 11, 1879; application filed April 12, 1878.

*To all whom it may concern:*

Be it known that I, JOHN A. KNIGHT, of Auburn, in the county of Androscoggin and State of Maine, have invented certain new and useful Improvements in Cheese-Boxes; and I do hereby declare that the following is a full, clear, and exact description of the invention, which will enable others skilled in the art to which it appertains to make and use the same, reference being had to the accompanying drawing, and to letters of reference marked thereon, which form a part of this specification.

The figure is a side sectional elevation, with the platform drawn out and the side piece dropped down.

Similar letters show like parts.

My invention is to produce an improved cheese-box.

The box is shown by the parts $a\ a\ a\ a'$. $a'$ is one side or end of the box, that drops down, as seen in the figure, to permit of the drawing out of the platform $b$. The platform $b$ is provided with trucks or rollers $c$, upon which it easily moves out of and into the box. It has also the projecting piece $d$ on its under side, to strike the stop $e$ on the bottom of the box, near the edge, in order to stop the platform when drawn sufficiently far out of the box.

The cheese is placed on the platform. When the platform is pushed within the box $a\ a\ a\ a'$, as seen in the figure, and the side $a'$ closed up, the cheese is sufficiently covered and protected; and it can be readily drawn out when a piece is to be cut off.

Wire-gauze or glass can be fitted into the sides of the box, if desired.

When the sides are solid, as when glass sides are employed, a small ventilator is fitted into the top of the box, and so arranged as to be opened or closed when desired. This will prevent moist cheese from molding.

What I claim as my invention, and desire to secure by Letters Patent, is—

The combination of the box shown and indicated by $a\ a\ a\ a'$, platform $b$, with its rollers $c$, and pieces $d$ and $e$, as herein set forth.

In testimony that I claim the foregoing as my own I affix my signature in presence of two witnesses.

JOHN A. KNIGHT.

Witnesses:
 WILLIAM HENRY CLIFFORD,
 CHAS. H. KIMBALL.